Aug. 31, 1965   H. Y. MOSEY   3,203,371
MACHINES FOR WHIPPING OF CONFECTIONERY FILLING AND DAIRY CREAM
Filed Sept. 24, 1962   2 Sheets-Sheet 1
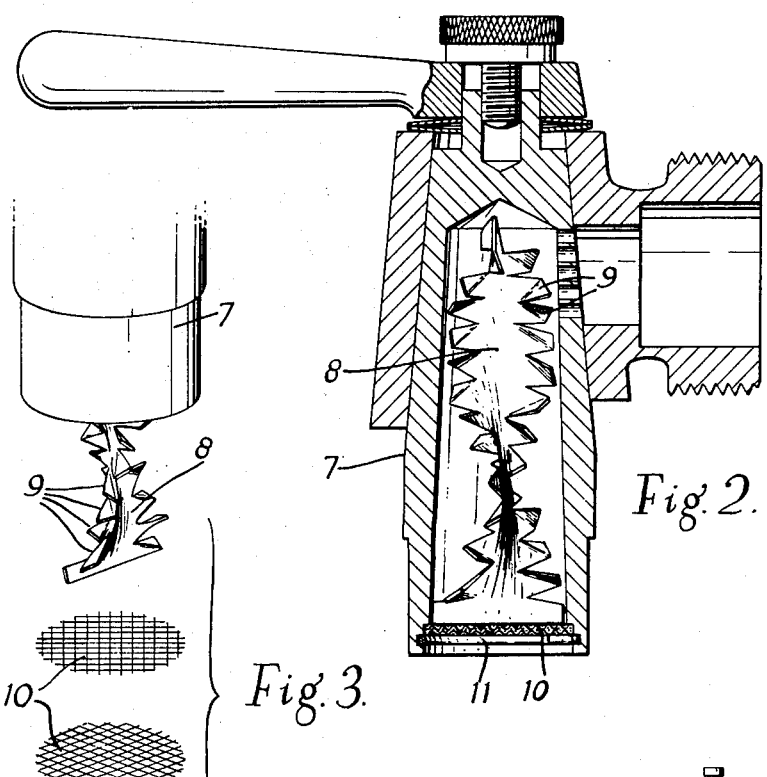
Fig. 2.
Fig. 3.
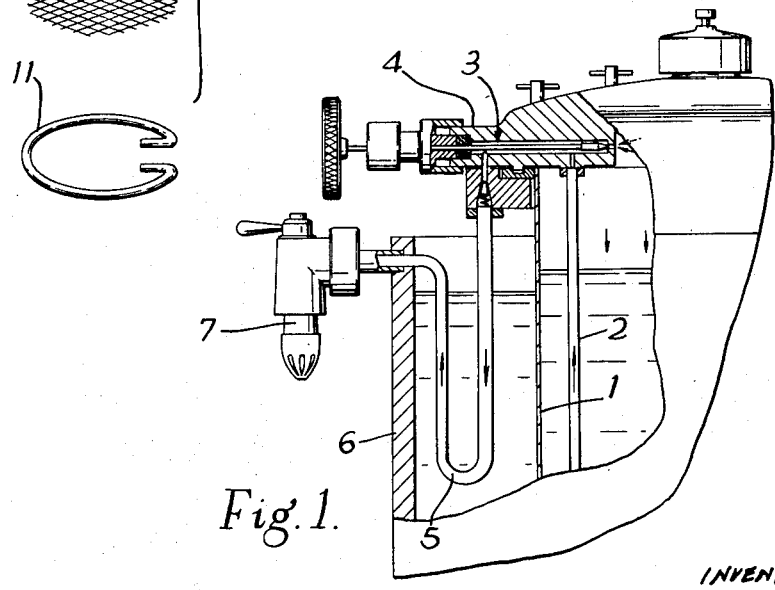
Fig. 1.
INVENTOR
HAROLD YEOMAN MOSEY
BY Emery L. Groff Jr.
Atty Aug. 31, 1965     H. Y. MOSEY     3,203,371
MACHINES FOR WHIPPING OF CONFECTIONERY FILLING AND DAIRY CREAM
Filed Sept. 24, 1962     2 Sheets-Sheet 2

INVENTOR
HAROLD YEOMAN MOSEY

United States Patent Office 3,203,371
Patented Aug. 31, 1965

3,203,371
MACHINES FOR WHIPPING OF CONFECTIONERY FILLING AND DAIRY CREAM
Harold Yeoman Mosey, Bridge Road, Southall, England
Filed Sept. 24, 1962, Ser. No. 225,527
Claims priority, application Great Britain, Sept. 29, 1961, 35,156/61
3 Claims. (Cl. 107—31)

The present invention concerns improvements in or relating to machines for whipping of confectionery filling and dairy cream.

In particular the invention is concerned with cream whipping machines of the kind in which liquid cream is forced under the influence of air pressure to a dispensing tap or nozzle by way of an air regulator valve to which compressed air at a required pressure, for example at about 75–90 lbs. per square inch, is admitted.

Machines have long been in existence for whipping genuine cream, i.e. cream obtained from milk. It is found, however, that these known machines do not operate efficiently when used for whipping confectionery filling and that the whipped confectionery filling obtained is of a coarse texture, is unstable and likely to collapse after being shaped by "piping." Such machines cannot therefore be used to the best advantage, particularly in large bakeries and similar establishments where it is required to apply whipped confectionery filling to huge quantities of cakes and sponges every hour because unless the filling remains self-sustaining the appearance of a cake or sponge is spoiled and is rejected.

It has been ascertained that this is due to the presence of large air cells in the whipped cream and accordingly the object of the invention is to provide, in or for a confectionery filling or cream whipping machine, means for breaking down these large air cells so that the filling or whipped cream possesses a fine and smooth texture as it is discharged from the machine tap or nozzle. This is achieved by ensuring that the air upon leaving a U-tube through which the cream or filling passes on its way to the dispensing tap or nozzle is caused to intermix intimately in the dispensing tap or nozzle with the cream with the result that a whipped cream of a homogeneous and self-sustaining nature is obtained.

Broadly, according to the present invention, there is provided in or for a confectionery filling or cream whipping machine, a cream dispensing tap or nozzle within which is provided a baffle which causes the aerated cream or filling passing through the nozzle to pass through a helical path as it impinges against said member and which also acts as the cream is displaced axially thereof, to disintegrate the cream so that substantially all particles thereof are caused to mix intimately with the air.

The fitment of the baffle in the dispensing nozzle results in whipped filling or cream being obtained having a fine even texture in which the presence of large air cells is eliminated thereby rendering the whipped cream or confectionery filling self-sustaining, particularly when piped. It has been found, during tests, that any sharp edges possessed by the piped cream or filling remain perfectly defined long after piping and there is no tendency for the shape to collapse. Also, the appearance of the cream or filling is greatly enhanced because, due to the absence of large air cells, the product appears smooth and rich and its texture is not dulled by the presence of the large cells.

From the foregoing it will be appreciated that the present invention enables existing cream whipping machines to be quickly and easily adapted for whipping confectionery filling and dairy cream.

To enable the invention to be clearly understood, a preferred embodiment of the invention will now be described by way of example with reference to the accompanying drawings, wherein:

FIGURE 1 is a fragmentary view showing the pertinent part of an existing machine with which the invention is concerned.

FIGURE 2 is a vertical section through a dispensing nozzle fitted with one form of baffle of this invention.

FIGURE 3 is an exploded perspective view of parts of FIGURE 2, and

Figure 4:
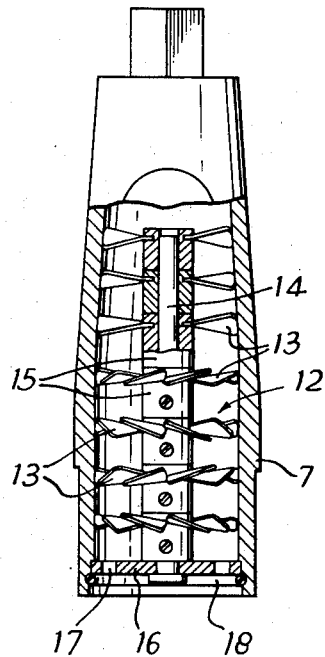
FIGURE 4 is a vertical section of a nozzle fitted with a modified form of baffle.

Referring firstly to FIGURE 1, this figure illustrates part of a conventional cream whipping machine and shows how cream in a container 1 is forced by air pressure into and up a feed tube 2 leading to a passage 3 in an adjustable air valve 4. A mixture of the cream and a predetermined quantity of air then passes through a U-tube 5 in a water cooled tank 6 to a dispensing tap or nozzle 7. Usually, the U-tube 5 and the nozzle 7 are filled with hardened glass beads which, in the case of dairy cream is sufficient to cause the cream to be sufficiently acted upon by the air to produce whipped cream but nevertheless with large and uneven air cells. These beads, however, do not act so favourable when confectionery filling is being whipped and also leaves larger air cells in the whipped cream as previously explained.

Figure 5:
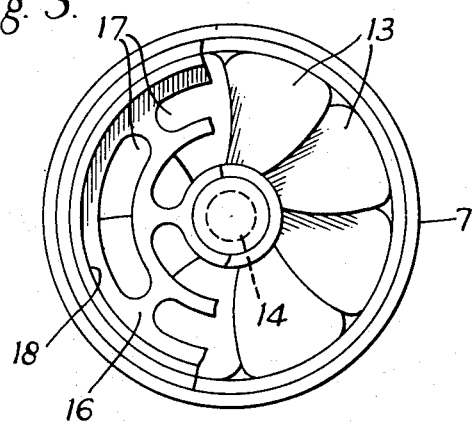
FIGURE 5 is an inverted plan view of FIGURE 4 drawn to a larger scale.

The present invention is concerned essentially with the dispensing tap or nozzle and consists in replacing the hardened glass beads with a baffle 8 as shown in FIGURE 2 or the baffle 12 shown in FIGURES 4 and 5. This baffle 8 may be made in any suitable manner, that shown in FIGURE 2 comprising a strip of chrome steel which is twisted into a helical form and this strip is formed with a plurality of transverse slits to provide a multiplicity of teeth or tongues 9 which extend more or less radially from the axis of the helical bent strip.

These teeth or tongues 9 are bent out of the plane of the strip, conveniently by twisting two radially aligned oppositely directed teeth in opposite directions about a centre line or axis connecting the two teeth. This baffle 8 is inserted into the nozzle 7 and the outer end of the nozzle is closed by two discs 10 of gauze or equivalent material which are arranged with their openings staggered to provide in effect a very fine gauze and these discs are retained in position by a circlip 11 which takes into a groove in the outer end of the nozzle.

The baffle 12 illustrated by FIGURES 4 and 5, comprises a plurality of individual elements of disc-like form each of which is formed with a number of radial slits to provide tongues or teeth 13 which are bent or twisted out of the plane of the disc. As shown in these figures the tongues 13 of one disc are twisted so as to slope from left to right as viewed on the drawing and an adjacent disc has its tongues twisted so as to slope from right to left. The discs may conveniently be secured to a fixed spindle 14 and positioned thereon in axially spaced-apart relation between locking collars 15 which are secured to the spindle 14. As shown in FIGURE 5 it is preferred, although not essential, to make the leading and trailing edges of the tongues 13 curved. The lower end of the spindle is fitted to an end plate 16 formed with slots or openings 17, the end plate 16 being retained in position in the lower end of the nozzle 7 by means of a circlip 18. Alternatively, the lower end of the spindle 14 may be fitted with gauze discs 10 as described in the first embodiment.

In operation, aerated cream from the U-tube 5 enters the upper end of the nozzle and as it is impeded by and forced past the baffle 8 or 12 it is (a) caused to follow a helical path and (b) the helical ribbon so formed is itself cut transversely into finer ribbons which are continuously broken or cut up by the teeth 9 or 13 as the cream travels towards the discharge end of the nozzle 7. The result is that the cream is continuously ribboned and the ribbons continuously cross cut so that the air is brought into intimate contact with the cream, thereby eliminating the formation of large air cells and so avoiding producing a whipped cream or confectionery filling having a coarse texture.

The formation of the teeth 9 or 13 in the manner above described is given by way of example only, and it will be appreciated that similar results will be obtained if the teeth are not symmetrical, i.e. the teeth could be alternately bent in opposite directions or in an irregular manner.

The U-tube 5 is preferably still filled with hardened glass beads as is at present customary.

I claim:

1. A nozzle for dispensing of a confectionery or cream whipping, including, baffle means disposed within said nozzle, said means comprising a plurality of disc-like elements, a supporting spindle axially disposed within said nozzle and fixedly mounted therein, each of said elements provided with a central collar for locking said elements to said spindle in an axially spaced-apart relationship, said elements each having a plurality of radial slits providing teeth, said teeth being twisted out of the plane of said elements with the teeth of one element sloping in a direction opposite that of the teeth of an adjacent element, and means having a plurality of apertures at the discharge end of the nozzle, whereby, ribbons of cream directed through the nozzle are divided transversely to cause air to make intimate contact with the particles of cream.

2. A nozzle according to claim 1, wherein the periphery of said teeth abut the inner wall of the nozzle bore within which said elements are disposed.

3. A device for fitment in a dispensing tap of a confectionery filling or cream whipping machine comprising a baffle consisting of a plurality of individual cream-dividing elements, a supporting spindle upon which the elements are mounted, collars mounted on said spindle for spacing the elements apart axially, each of said elements being of disc-like form and being formed with radial slits providing teeth, the teeth being twisted out of the plane of the disc and the discs being arranged so that the teeth of one element slope in an opposite direction to those of an adjacent element, whereby impinging ribbons of cream passing through the tap are divided transversely so that air is caused to make intimate contact with the particles of cream and a pair of gauze discs fitted to the spindle at the outlet of the tap with their openings staggered, and through which the whipped cream is discharged.

References Cited by the Examiner

UNITED STATES PATENTS

| | | | |
|---|---|---|---|
| 1,626,487 | 4/27 | Warren | 259—4 |
| 2,536,340 | 1/51 | Alikonis | 107—31 |
| 2,622,411 | 12/52 | Ogden | 259—8 |
| 2,896,925 | 7/59 | Place | 259—107 |
| 2,956,522 | 10/60 | Young | 107—31 |

CHARLES A. WILLMUTH, *Primary Examiner.*